(12) United States Patent
Chan

(10) Patent No.: US 6,925,166 B1
(45) Date of Patent: Aug. 2, 2005

(54) METHOD AND APPARATUS FOR GENERATING AUTOMATIC GREETINGS IN A CALL CENTER

(75) Inventor: Norman C. Chan, Louisville, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/482,969

(22) Filed: Jan. 12, 2000

(51) Int. Cl.[7] .............................................. H04M 3/00
(52) U.S. Cl. ...................... 379/265.02; 379/72; 379/80
(58) Field of Search ............................ 379/80, 100.05, 379/207.08, 69, 88.22, 205.01, 61.1, 265.22, 88, 265.7, 266.8, 72, 87, 88.01, 265.02, 201; 704/200

(56) References Cited

U.S. PATENT DOCUMENTS

| | | | | |
|---|---|---|---|---|
| 4,817,130 A | | 3/1989 | Frimmel, Jr. ................. | 379/88 |
| 4,941,168 A | * | 7/1990 | Kelly, Jr. ....................... | 379/69 |
| 5,430,792 A | * | 7/1995 | Jesurum et al. ........... | 379/88.01 |
| 5,511,112 A | * | 4/1996 | Szlam ................... | 379/266.06 |
| 6,226,360 B1 | * | 5/2001 | Goldberg et al. ............. | 379/69 |
| 6,430,271 B1 | * | 8/2002 | DeJesus et al. .......... | 379/88.22 |
| 6,449,260 B1 | * | 9/2002 | Sassin et al. ............... | 370/270 |
| 6,546,097 B1 | * | 4/2003 | Peltz ...................... | 379/265.07 |

FOREIGN PATENT DOCUMENTS

EP      0 886 416      12/1998      .......... H04M/1/274

* cited by examiner

*Primary Examiner*—Roland Foster
*Assistant Examiner*—Olisa Anwah
(74) *Attorney, Agent, or Firm*—Sheridan Ross P.C.

(57) ABSTRACT

A call center includes a message playback unit for playing back a prerecorded greeting during an outgoing call while a call classifier unit within the call center processes an audible signal received from a remote party location. A call processing unit places a call to a remote party location via a communication network to attempt to elicit a desired response from the remote party. The call classifier then processes an audible signal received from the remote party location to determine whether or not the call was answered by a live party. The prerecorded greeting is then played while the call classifier is simultaneously processing the audible signal. If the call classifier determines that the call was answered by a live party, the call processing unit completes a talk path between the remote party location and a local agent at the call center who handles the remainder of the call. The call processing unit will normally wait until the greeting has ended to complete the talk path. If the call classifier determines that the call was not answered by a live party, the call processing unit will terminate the call.

26 Claims, 3 Drawing Sheets

METHOD AND APPARATUS FOR GENERATING AUTOMATIC GREETINGS IN A CALL CENTER

TECHNICAL FIELD

The invention relates generally to call centers and, more particularly, to call handling systems for use in call centers.

BACKGROUND OF THE INVENTION

One of the many functions that can be performed by a call center is to place outgoing calls to parties from whom a predetermined response is desired. The desired response can be, for example, an answer to a question or the purchase of a product or service. When the outgoing call is answered, a call classifier unit is commonly used at the call center to determine whether a person (i.e., a live party) has answered the call or a machine (e.g., a telephone answering machine) has answered the call. If the call classifier determines that a live party has answered the call, control of the call is switched over to a live agent at the call center who handles the remainder of the call. If the call classifier determines that the call was not answered by a live party, the call is terminated or alternative action is taken.

The call classifier unit usually processes the first audible signal that is received over the telephone line after the call has been answered to make its determination. For example, a person answering a telephone will typically speak the word "hello" into the receiver and then wait for a response. The call classifier will process the "hello" signal while the called party waits. Because the processing performed by the call classifier unit generally takes a finite amount of time to perform (e.g., a few seconds), the called party normally hears silence on the line while he is waiting for a response. When faced with this awkward situation, a called party will often misinterpret the call and hang up thinking that, for example, an error has occurred or a trick is being played. The call center must then reinitiate the call or reschedule it for a later time. As can be appreciated, such occurrences can degrade overall call center performance.

Therefore, there is a need for a method and apparatus that will reduce the occurrence of call terminations during call classifier processing in a call center.

SUMMARY OF THE INVENTION

The present invention relates to a method and apparatus that is capable of increasing outgoing call success rates in a call center. The method and apparatus plays a prerecorded greeting for a called party during a period when a call classifier is processing an audible signal received during the call. Because the called party is listening to a greeting during call classifier processing, he/she is less likely to misinterpret the call and thus hang up before call classifier processing is complete. In addition, the greeting affords the call classifier additional time to perform call classification, thus increasing the accuracy of the classification process. Furthermore, use of a prerecorded greeting lightens the burden on the agent who normally handles calls in the call center as he/she does not have to repeat the same greeting for every call placed.

DETAILED DESCRIPTION

Figure 1:
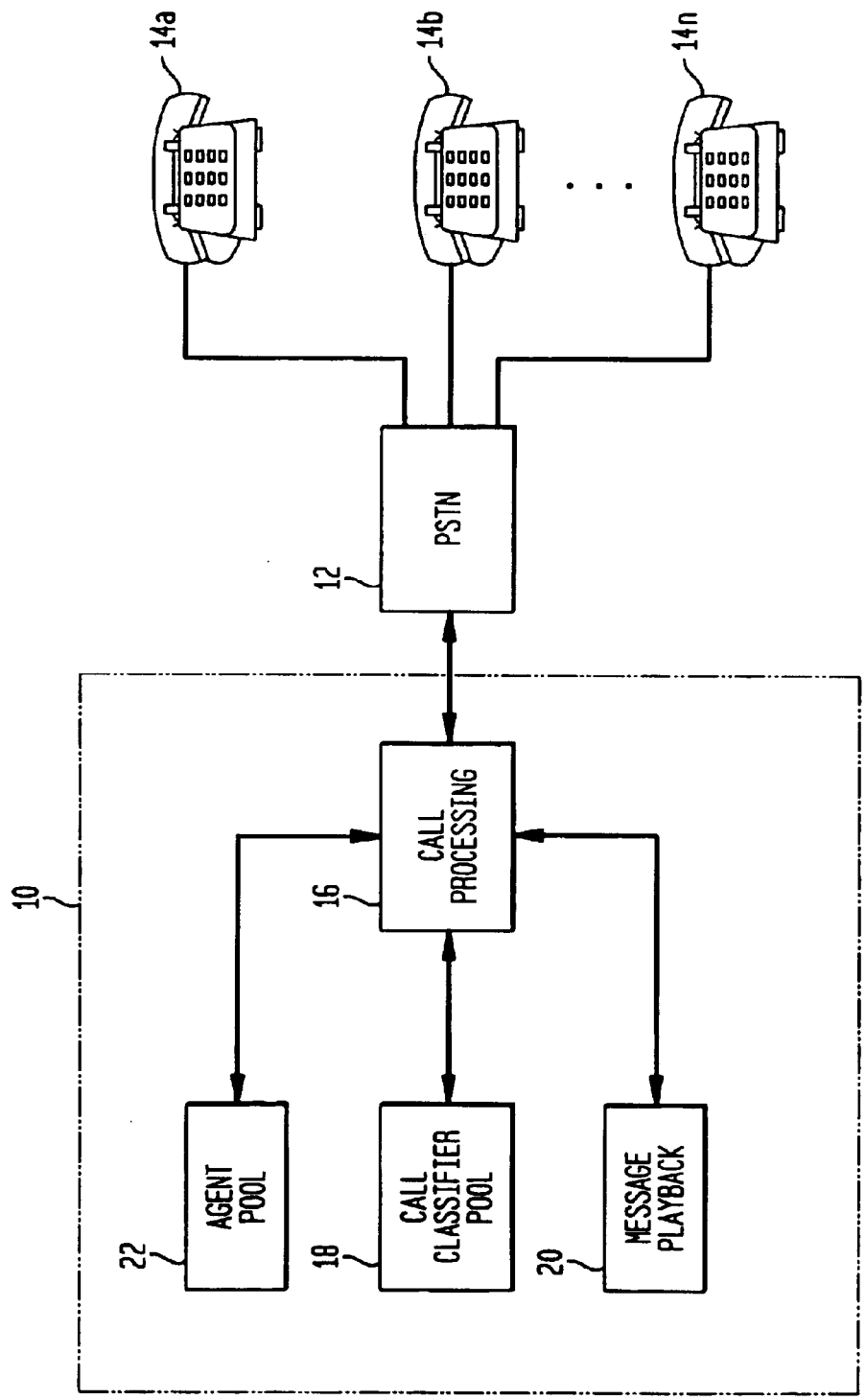
FIG. 1 is a block diagram illustrating a call center in accordance with one embodiment of the present invention.

FIG. 1 is a block diagram illustrating a call center 10 in accordance with one embodiment of the present invention. The call center 10 is coupled to a public switched telephone network (PSTN) 12 for use in placing calls to any of a multitude of remote user devices 14a, 14b, . . ., 14n. As illustrated, the call center 10 includes: a call processing unit 16, a pool of call classifier units 18, a message playback unit 20, and a pool of human agents 22. During normal operation, calls are placed from the call center 10 to predetermined parties at the remote user devices 14a, 14b, . . ., 14n to attempt to obtain a desired response from the called parties. For example, it may be desired to have a party subscribe to a particular service or purchase a particular product. Alternatively, it may be desired that the called party answer some questions or complete a survey. The performance of the call center 10 will normally be gauged by the number of calls that are successfully handled within a predetermined time period. Thus, it is very important that the number of calls that are prematurely terminated due to confusion or misunderstanding be minimized.

With reference to FIG. 1, the call processing unit 16 manages the placement and processing of calls and the recording of responses within the call center 10. When the call processing unit 16 determines that a call needs to be placed to a predetermined party, it dials a telephone number associated with the party to establish a communication connection with the party via PSTN 12. At the same time, or slightly thereafter, the call processing unit 16 assigns a call classifier from the call classifier pool 18 to the call for use in classifying audible signals received from the called party location during the call. The call classifier detects when the call has been answered and then waits for an audible signal from the called party location. When an initial audible signal is detected (which typically includes the word "hello" or a similar greeting), the call classifier assigned to the call processes the signal to determine whether it has originated from a live party or from a machine, such as an automated phone answering device. When the call classifier has completed processing of the audible signal, it delivers the results of the processing to the call processing unit 16. If the call classifier indicates that the call was answered by a live party, the call processing unit 16 immediately patches a waiting agent from the agent pool 22 into the connection to handle the remainder of the call. If the call classifier indicates that the call was not answered by a live party, the call processing unit 16 terminates the call or takes other action.

As can be appreciated, the processing performed by the call classifier includes some inherent processing delay to ensure accurate call classification. Thus, after the call classifier has received the initial audible signal from the called party location, there is typically a period of time before the call processing unit 16 knows whether a live party has answered. In accordance with the present invention, the call processing unit 16 signals the message playback unit 20 to play back a prerecorded greeting for the called party during the call classification period so that the called party will not be confused by an ensuing interval of silence.

In a preferred approach, the call classifier continues to monitor the call after the initial audible signal has been received from the called party location to detect a period of silence that lasts for at least a predetermined time period. This predetermined time period will generally be significantly shorter than the average processing delay of the call classifier. When the call classifier detects the period of silence, it signals the call processing unit 16 which then couples the message playback unit 20 into the connection and instructs the message playback unit 20 to begin playback of the prerecorded greeting. Other alternative occurrences can also be used to trigger playback of the prerecorded greeting. For example, playback can be initiated a predetermined time after the call has been answered or after call classifier processing has begun.

The prerecorded greeting can include any prerecorded message that is designed to maintain or increase a called party's interest in the present call so that the party will remain on the line until an agent can take over the call. For example, the prerecorded greeting can include a simple salutation (e.g., "Greetings from XYZ Corporation") with a short explanation of the purpose of the call. Preferably, the greeting will be in the voice of the agent who will subsequently handle the call.

While the message playback unit 20 is playing back the prerecorded greeting, the call classifier unit assigned to the call is simultaneously processing the initial audible signal. Eventually, the processing is completed and the results are transferred to the call processing unit 16. If the results indicate that the call was not answered by a live party, the call is immediately terminated. If the results indicate that the call was answered by a live party, the call processing unit 16 determines whether the message playback unit 20 is still playing back the greeting. If not, the call processing unit 16 immediately couples an agent from the agent pool 22 into the connection to handle the remainder of the call. If the message playback unit 20 is still playing back the greeting, the call processing unit 16 waits for the greeting to be completed before coupling the agent into the connection. After the agent has completed speaking with the called party, the call is terminated and the results of the call are recorded.

In a preferred embodiment, the call processing unit 16 is implemented using a programmable digital processing device, such as a general purpose microprocessor or a digital signal processor. The call classifiers within the call classifier pool 18 can be implemented in hardware or software. Call classification structures and techniques are generally well known in the art. The message playback unit 20 can include virtually any form of device that is capable of playing back stored voice signals in response to control signals from, for example, the call processing unit 16. For example, a conventional analog tape recorder device can be used. Alternatively, a device that is capable of playing back digitized voice signals stored in, for example, a mass storage device associated with the call processing unit 16 can be utilized as the message playback unit 20. In addition to message playback functionality, the message playback unit 20 will also preferably include means for recording verbal greetings from an agent.

The agents within the agent pool 22 are preferably human employees of the call center that are trained to solicit desired responses from the public. Each agent will normally be stationed at a computer terminal and wear a telephone headset during normal call center operations. In a preferred approach, an agent will be notified beforehand when a call has been placed for which the agent will be responsible once a live party answers the call. In some cases, the call processing unit 16 will wait for confirmation from the agent before a call is placed to ensure that the agent is ready. The computer terminal used by the agent can be a terminal of the digital processing device implementing the call processing function 16.

Figure 2:
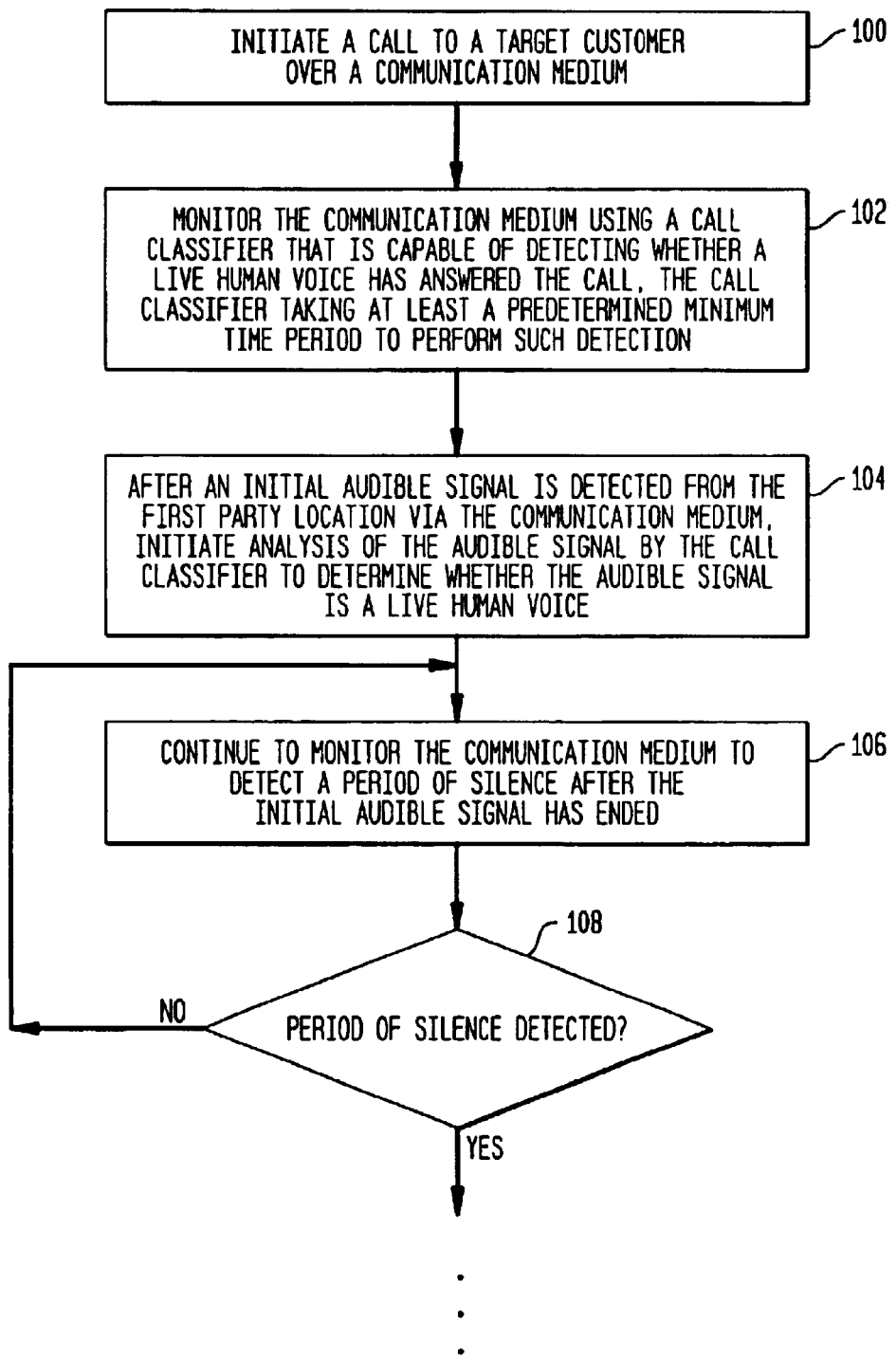
FIGS. 2 and 3 are portions of a flowchart illustrating a process for managing an outgoing call in a call center in accordance with one embodiment of the present invention.
Figure 3:
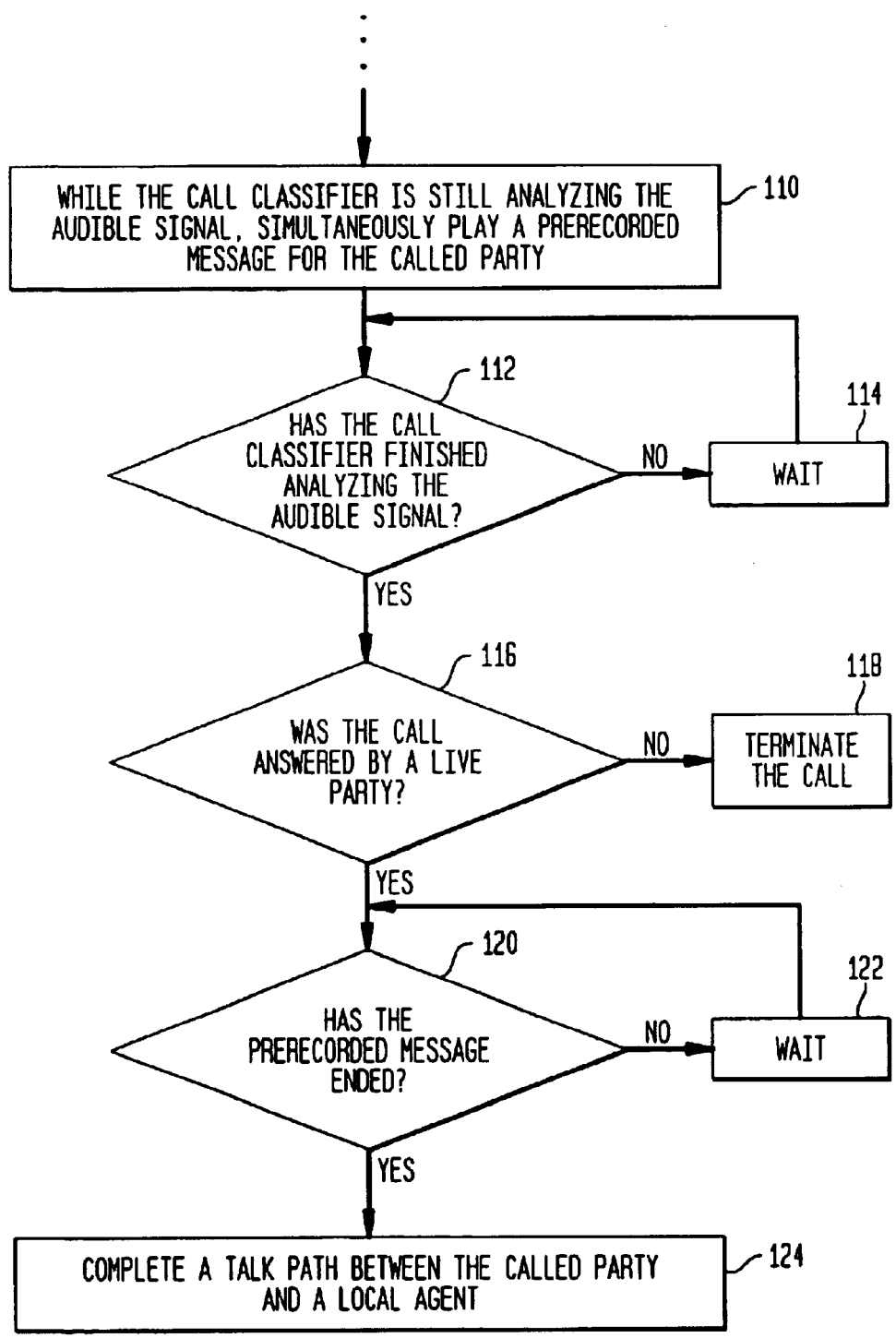

FIGS. 2 and 3 are portions of a flowchart illustrating a method for managing an outgoing call within a call center. With reference to FIG. 2, a call to a target customer is first initiated over a communication medium (step 100). The communication medium can include a link within a public switched telephone network (PSTN) or any other communication network that is capable of supporting voice communication. Some types of communication networks that can be used in accordance with the present invention include, for example, a satellite communication network, an optical fiber communication network, a local area network, a wide area network, a municipal area network, a private branch exchange network, the Internet, and/or a terrestrial wireless network. Next, the communication medium is monitored using a call classifier to detect and classify signals from the first party location (step 102). The call classifier is capable of processing a received signal to determine whether the signal originated from a live party or from a machine.

After an initial audible signal is detected from the first party location, analysis of the audible signal is initiated within the call classifier to determine whether the audible signal is a live human voice (step 104). The call classifier continues to monitor the communication medium after the initial audible signal has ended to detect a period of silence having a predetermined duration on the communication medium (step 106). When the period of silence is detected, a prerecorded message is played in response thereto (steps 108 and 110). Thus, the playback of the prerecorded message and the analysis of the audible signal by the call classifier are simultaneously performed within the call center.

It is next determined whether the call classifier has finished analyzing the audible signal (step 112). If not, the method waits for the analysis to be completed (step 114). The call classifier eventually makes a determination as to whether the initial audible signal is a live human voice or not. If the audible signal is determined by the call classifier to be other than a live human voice, the call is terminated (steps 116 and 118). If the audible signal is determined to be a live human voice, it is next determined whether playback of the prerecorded message has ended (step 120). If playback has not yet ended, the method waits until playback has ended (step 122). When playback has ended, a talk path is completed between the called party and a local agent within the call center (step 124). The local agent then handles the remainder of the call. Although the present invention has been described in conjunction with its preferred embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for use in managing outgoing calls in a call center, comprising:

initiating a call to a first party from the call center via a communication medium, wherein, before the call is answered, a first agent of the call center has been selected to service the call;

monitoring said communication medium for signals received from a called location associated with said first party after said step of initiating a call;

detecting an initial audible signal received from the fist party location via said communication medium, wherein the initial audible signal is the first signal detected on the communication medium after said call is answered;

initiating processing of said initial audible signal in a call classifier to determine a characteristic of said initial audible signal, said step of initiating processing includes initiating processing that will analyze whether said initial audible signal was generated by a live party; and playing a prerecorded greeting over said communication medium during said call, said prerecorded greeting being played during a time period when said call classifier is processing said initial audible signal, wherein the analysis whether said initial audible signal was generated by a live party is the initial call classifier analysis made during the call, and wherein the prerecorded greeting is recorded in the voice of the first agent.

2. The method claimed in claim 1, wherein:
said step of playing a prerecorded greeting includes detecting a period of silence on said communication medium and initiating playback of said prerecorded greeting in response thereto.

3. The method in claim 1, further comprising the step of:
when said call classifier determines that said initial audible signal was generated by a live party at the first party location, establishing a talk path between the live party and an agent at the call center after playback of said prerecorded greeting has ended.

4. The method in claim 1, further comprising the step of:
when said call classifier determines that said initial audible signal was not generated by a live party at the first party location, terminating the call.

5. The method in claim 1, wherein:
said communication medium includes a local loop associated with a telephone network.

6. The method in claim 1, wherein:
said step of initiating a call includes dialing a telephone number associated with said first party and said initial audible signal is received from the location associated with the first party during said call.

7. A method for use in managing an outgoing call comprising the steps of:
placing an outgoing call from a call center to a remote party location over a communication network, wherein, before the placing step, a first agent of the call center has been selected to handle the outgoing call when the call is answered by a live party at the remote party location;

processing an initial signal received from said remote party location during said call to determine a source type of said initial signal, wherein the processed signal is the first signal detected from the remote party location after said call is answered;

playing a prerecorded greeting to said remote party location during said step of processing, wherein said step of playing a prerecorded message includes detecting a period of silence after receipt of said initial signal and initiating playback of said prerecorded greeting in response thereto, and wherein the prerecorded greeting is recorded in the voice of the first agent; and after said prerecorded greeting has ended, establishing a talk path between the first agent and the remote party location when it is determined that said initial signal is a voice signal that was generated by the live party during the call, and wherein the determination whether the initial signal is a voice signal that was generated by the live party during the call is the initial such determination made during the call.

8. The method claimed in claim 7, further comprising the step of:
terminating the call when it is determined that said initial signal was not generated by the live party during the call.

9. The method claimed in claim 7, wherein:
said step of placing an outgoing call includes dialing a telephone number associated with a remote party and said initial signal processed in the processing step is the initial audible signal received during said call.

10. The method claimed in claim 7, wherein:
said communication network includes a public switched telephone network.

11. The method claimed in claim 7, wherein:
said step of processing a signal includes using a call classifier to determine whether the initial signal was generated by a live party during the call.

12. The method claimed in claim 7, wherein:
said step of establishing a talk path includes passing control of said call to said first agent for a remainder of the call.

13. A system for use within a call center, comprising:
a call processing unit operable to place a call to a remote party location via a communication network, wherein, before the call is placed, a first agent is assigned to service the call if the call is answered by a live party at the remote party location;

a call classifier unit operable to determine when said call is answered, detect an audible signal from the remote party location, and analyze a first detected audible signal received from said remote party location to determine whether said first detected audible signal originated from the live party during the call, and wherein the first detected signal is the first signal detected by the call classifier unit after said call is answered;

a message playback unit operable to play back a prerecorded message to said remote party location while said call classifier unit is analyzing said first detected audible signal, wherein the prerecorded message is recorded in the voice of the first agent; and a switch unit operable to establish a talk path between a local agent position and said remote party location when it is determined by said call classifier unit that said first detected audible signal originated from the live party during the call, and wherein the determination whether the first detected audible signal is a voice signal that was generated by the live party during the call is the initial such determination made during the call.

14. The system claimed in claim 13, wherein:
said message playback unit plays back said prerecorded message in response to detection of a period of silence during said call.

15. The system claimed in claim 13, wherein:
said external communication network includes a public switched telephone network and said first detected signal is received during said call.

16. The system claimed in claim 13, wherein:
said external communication network includes at least one of the following: a satellite communication network, an optical fiber communication network, a local area network, a wide area network, a municipal area network, a private branch exchange network, an Internet network, and a terrestrial wireless network.

17. The system claimed in claim 13, wherein:

said call processing unit includes means for terminating said call when it is determined by said call classifier unit that said first detected signal did not originate from the live party during the call.

18. The system claimed in claim 13, wherein:

said call processing unit and said switch unit are implemented within a common digital processor.

19. The system claimed in claim 13, wherein:

said call processing unit and said message playback unit are implemented within a common digital processor.

20. The system claimed in claim 13, wherein:

said call classifier unit is part of a pool of call classifier units; and said call processing unit is operable to assign call classifier units from said pool of call classifier units to individuals calls being supported by the call center.

21. The method claimed in claim 1, wherein the call to the first party is the initial call made by the call center to the first party.

22. The method claimed in claim 7, wherein the outgoing call to the remote party location is the initial call made to the remote party location.

23. The system claimed in claim 13, wherein the call to the remote party location is the initial call made by the call center to the remote party location.

24. The method claimed in claim 1, wherein the first agent is in a pool of multiple agents associated with the call center, wherein the greeting is a personal greeting, and wherein each agent in the pool of agents has a corresponding prerecorded greeting recorded in the respective agents' own voice and further comprising:

selecting a second agent, different from the first agent, in the pool of agents to service a second call to a second party location, different from the first party location, over the communication medium; and playing a second prerecorded greeting corresponding to the second agent during call classification of a second initial audible signal received from the second party location during the second call.

25. The method claimed in claim 7, wherein the first agent is in a pool of multiple agents associated with the call center, wherein the greeting is a personal greeting, and wherein each agent in the pool of agents has a corresponding prerecorded greeting recorded in the respective agents' own voice and further comprising:

selecting a second agent, different from the first agent, in the pool of agents to service a second call to a second party location, different from the remote party location, over the communication network; and playing a second prerecorded greeting corresponding to the second agent during call classification of a second initial audible signal received from the second party location during the second call.

26. The system claimed in claim 13, wherein the first agent is in a pool of multiple agents associated with the call center, wherein the message is a personal greeting, wherein each agent in the pool of agents has a corresponding prerecorded message recorded in the respective agents' own voice, wherein the call center is operable to select a second agent, different from the first agent, in the pool of agents to service a second call to a second party location, different from the remote party location, over the communication network, and wherein the message playback unit is operable to play back a second prerecorded message, different from the prerecorded message played back to the remote party location, corresponding to the second agent during call classification of a second initial audible signal, different from the initial audible signal from the remote party location, received from the second party location during the second call.

* * * * *